DIGITAL COMPARISON-TO-ANALOG SIGNAL CONVERTER

Filed Dec. 16, 1964 3 Sheets-Sheet 1

INVENTORS
ROBERT J. BLACK
FRANK J. SORDELLO
BY Fraser and Bogucki
ATTORNEYS

INVENTORS
ROBERT J. BLACK
FRANK J. SORDELLO
BY
Fraser and Bogucki
ATTORNEYS

INVENTORS
ROBERT J. BLACK
FRANK J. SORDELLO
BY
Fraser and Bogucki
ATTORNEYS

United States Patent Office 3,518,658
Patented June 30, 1970

3,518,658
DIGITAL COMPARISON-TO-ANALOG SIGNAL CONVERTER

Robert J. Black, Los Gatos, and Frank J. Sordello, San Jose, Calif., assignors to International Business Machines Corporation, Armonk, N.Y., a corporation of New York Filed Dec. 16, 1964, Ser. No. 418,602
Int. Cl. H03k *13/02*
U.S. Cl. 340—347 15 Claims

ABSTRACT OF THE DISCLOSURE

A system for generating an analog signal to control a movable mechanism, such as a movable transducer in a random access memory, responds to digital representations of actual and desired positions by generating a series of reference pulses and a series of time varying pulses having substantially the same frequency but phase relationships determinative of positional error. The time intervals between successive pairs of pulses are used to generate signals of appropriate amplitude and sense to move the transducer to its desired position.

This invention relates to signal generating systems which respond to digital input signals, and more particularly to systems for generating analog output signals in response to the time relationship between variably time displaced digital input signals.

Many digital-to-analog converters are presently in use in data processing and modern control mechanisms, because they perform the vital function of actuating a mechanically controlled element from data provided by a digital system. Because the speed and precision of a mechanical system are largely determinative of the desired characteristics for the converter, in addition to economic considerations, many different types of digital-to-analog conversion systems are currently in use. These conversion systems are often required to operate in response to particular input conditions, such as an amplitude- or time-varying relationship of a binary nature. The problems involved in deriving an analog output signal from this initial digital relationship are often greatly complicated because of the manner in which the digital relationship is provided as input.

One example of an analog-to-digital conversion system which requires substantial processing of the input signal is provided by the type of system in which the time or phase relationship between two signals is to be converted to an equivalent analog value. In this sense, of course, the phase relationship of two signals of the same frequency may be considered to be an analog relationship. Nevertheless, the time relationship of two such signals may be denoted by pulses which demarcate specific transition points (e.g., zero crossings) in the signals, and these time-varying pulses may therefore be said to constitute the digital input signals for the converter. In a specific example of such a system, one series of pulses may be provided as a reference at a substantially fixed frequency, with the other series of pulses having substantially the same frequency, but each successive pulse occurring at some unknown or to be determined time relationship to each individual pulse of the reference series. A straightforward way of handling this conversion is to start a binary counter with the reference pulse, to count at a fixed frequency until the application of the time varying pulse, then to generate an analog voltage proportional to the count, and to use a slidewire or other technique to servo a controlled mechanism to a position determined by the analog voltage. Such techniques are unduly complex and expensive, not only because of the servo circuits involved, but also because of the cost of the counter units and the associated logic circuitry. The logic circuits are further complicated by the fact that proper provision must be made for the situation in which the time varying pulse leads the reference pulse in time.

The problem of generating an analog voltage which is representative in both amplitude and polarity of the difference between a pair of digital quantities, either amplitude differing or time differing quantities, is presented by a system which must position a given member precisely at a specified digital address relative to some other member. For example, in a modern high-speed random access memory system, high capacity is achieved by providing an extremely large recording surface area, or large number of recording tracks, and positioning a transducer in any given location relative to the recording surface. In order to achieve high density recording, and thus effectively decrease the access time while increasing the storage capacity, the specified recording track must be located exactly but with minimum delay once a command is provided. For this purpose, coarse and fine positioning circuits are ordinarily employed, with the coarse positioning circuit operating to provide fast movements over relatively long distances, whereas the fine positioning circuits control precise tracking of a selected recording track. Typically, a digital signal will be generated to represent the actual position of the transducer mechanism. Here also the straightforward way to control transducer position is to make a subtraction of one quantity relative to the other, and convert this quantity to an analog voltage, employing straightforward techniques to achieve superior response time. Extensive circuitry is required for this approach, however, both to effect the subtraction and convert the resultant value to its analog equivalent. It is, of course, not feasible to simply move the transducer at a selected rate until the addresses match, because of the substantial increase which this introduces into the access time.

It is therefore an object of the present invention to provide an improved system for generating an analog voltage from the relationship of a pair of digital quantities.

Another object of the present invention is to provide an improved system for controlling the position of a transducer in a random access memory in response to an applied desired address.

A further object of the present invention is to provide an improved system for generating an analog voltage signal representative of the time relationship of a pair of comparable signals.

Yet another object of the present invention is to provide an improved device for providing an analog output signal representative of the results of a digital comparison.

A further object of the present invention is to provide an improved servo system for controlling the positioning of a member whose actual position may be expressed digitally, with the desired position also being expressed digitally.

These and other objects are achieved in accordance with the invention by a circuit which converts the results of digital relationships directly into time displacements, and then converts the time displacements directly into analog voltages. The equality relationship between the desired address and the count presented by a repetitive counter having a given count cycle is identified by a time varying reference pulse, and the actual position of a transducer is similarly identified relative to the recycling count as a time varying pulse representative of the transducer position. Thus a series of reference pulses and a series of time varying pulses having substantially the same frequency but varying phase displacements are provided, wherein the phase relative to the reference pulse is representative of an error signal. From these series of pulses, ramp signal generators are actuated to provide output signals of polarity and amplitude appropriate to the correction needed for the control of the mechanism to be positioned.

In one specific example in accordance with the invention, the transducer is utilized in a random access memory system of the type which controls coarse positioning of the transducer by an analog voltage determined from the digital comparison of a specified address with the actual position of the transducer. A counter having a fixed resetting count (e.g., 512) may be actuated at a high frequency in synchronism with the operation of the storage member relative to which the transducer is to be positioned. The address of the actual position of the transducer and the desired command address are each compared continually to the ascending address in the cycling counter, and equality pulses are generated at those points in time at which the separate two addresses are equal to respective counts presented by the counter. Thus the equality relationship of the desired address provides one pulse, used as a reference, whereas the other equality relationship provides a second pulse which either precedes or succeeds this reference in time. These two pulses are applied to a gating network and control either of two ramp generators, each of which generates a signal varying linearly with time to a final voltage which is then maintained constant. The final voltage is determined by the time relationship of the second of the two pulses, and the gating network insures that only one of the two ramp generators is employed, dependent upon whether the transducer is to be driven in one direction or another.

In accordance with another feature of the invention, a pair of ramp generators is utilized for each direction of movement of the mechanism being controlled. The ramp generators are used on alternate cycles, and provide a continuous, transient-free voltage at a common output terminal. In accordance with another aspect of the invention, the output signals from the ramp generators are arranged to vary in discrete amounts, thus providing more positive and accurate control of mechanism position.

The invention will be better understood in the light of the following description, together with the accompanying drawings, in which.

Figure 1:
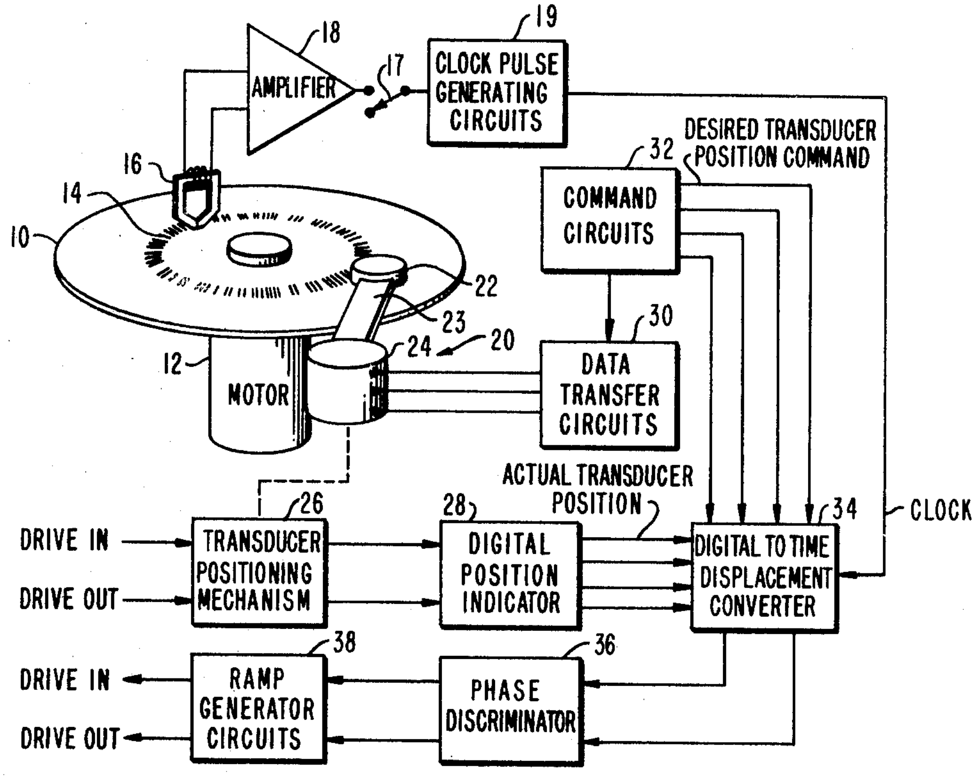
FIG. 1 is a simplified partial perspective and block diagram representation of the arrangement of one system in accordance with the invention, showing its use in conjunction with a random access memory system.

The general arrangement of a random access memory system utilizing, in this example, a rotating magnetic disk for data recording and reproduction is shown in FIG. 1. The disk 10 may be only one of a number of parallel disks in a multidisk array mounted on a common shaft, but only one disk 10 is shown for simplicity. The disk 10 is driven at a high rate of speed by a drive motor 12, which may or may not be servo controlled, as desired. The disk 10 also includes a reference pattern 14 bearing magnetic or optical indicia. Where the reference pattern 14 is a magnetic clock track of a selected periodicity, representative signals are generated by a magnetic head 16 and may be applied through preamplifier circuits 18 and a switch 17 to clock pulse generating circuits 19. The switch 17 permits selection of a number of synchronizing sources or may permit the clock circuits 19 to be free-running. A wide variety of other timing pulse generating systems may be employed, but for the purposes of the present specification (with the switch 17 closed to complete the path to the amplifier 18) the clock pulses serve to provide a plurality of radial divisions of the disk 10 position.

A data transducer mechanism 20 is disposed adjacent the magnetic disk 10. The data transducer mechanism 20 principally comprises a data transfer head assembly 22 which is radially positionable relative to the disk 10. By way of example, the head assembly 22 is shown mounted on the end of a radial arm 23 which is movable from a hub 24. A transducer positioning mechanism 26 is coupled to the hub 24, which includes the necessary circuit connections to data transfer circuits 30 and associated equipment. A digital position indicator 28 is coupled to the transducer positioning mechanism 26, and thereby arranged to indicate in binary form the actual transducer position on the data tracks. While this may be done in a variety of ways, including the use of an analog-to-digital converter, it is assumed here that a particular system is employed. In this particular system, the disk 10 is provided with 512 data tracks, this number corresponding to the number previously mentioned as the count base for the clock track reference pattern 14. As the transducer mechanism 20 passes each track position, a separate pulse is generated so that a separate counter may be pulsed to advance or subtract, depending on the direction of movement, and thereby provide a continuous binary digital indication of the transducer position. The transducer mechanism 20 may include a reference pattern sensor of a magnetic or optical type for this purpose, if desired. Additionally, the reference pattern 14 itself may include radial variations by which the separate data track positions may be identified. Such details have not been shown for purposes of simplicity, but it will be understood that the digital position indicator 28 provides the desired binary digital count.

Data transfer circuits 30 are coupled to the data lines from the transducer mechanism 20, and are actuated under the control of command circuits 32 which provide the data to be recorded or accept the data being reproduced. The command circuits 32 also provide the command for desired transducer position in binary digital form.

Both the command which identifies the desired transducer position and the signal combination which identifies the actual transducer position are applied to a digital-to-time displacement converter system 34, specific examples of which are given below. Clock signals are also provided to this converter, to provide a timing reference and to divide given time intervals into equal increments. In response to the two applied input signals, the digital-to-time displacement converter 34 generates two series of pulses, one on each of two output lines. A first series of pulses represents, in time position along a reference axis established by the clock pulses, the desired address, whereas the other series of pulses identifies in similar fashion the actual transducer address. The two pulse series have substantially the same frequency over the time intervals involved, but have a varying phase relation, depending upon the amount of displacement of the transducer relative to its desired position. The two series of pulses are applied to separate inputs of a phase discriminator circuit 36, which generates control signals for ramp generator circuits 38 dependent upon the lead-lag relation of the two pulse series and the time differential between successive pulses. The ramp generator circuits 38 generate DC voltage levels which constitute control signals for the transducer positioning mechanism 26, to drive the head assembly 22 in or out relative to the random access memory disk 10.

The operation of this arrangement is essentially in the form of a closed-loop servo which drives the binary indication of actual transducer position derived from the digital position indicator 28 in a compensatory fashion until the address matches the address specified for the desired transducer position, given from the command circuits 32. The clock signal provides a time base, along which the desired and actual address quantities may be represented as successive phase varying pulses. The digital-to-time displacement converter 34 thus generates the time, or phase, displaced pair of pulse series and the phase discriminator 36 and ramp generator circuits 38 convert this time displacement to a signal whose amplitude and polarity provide the necessary corrective motion of the transducer positioning mechanism 26.

Figure 2:
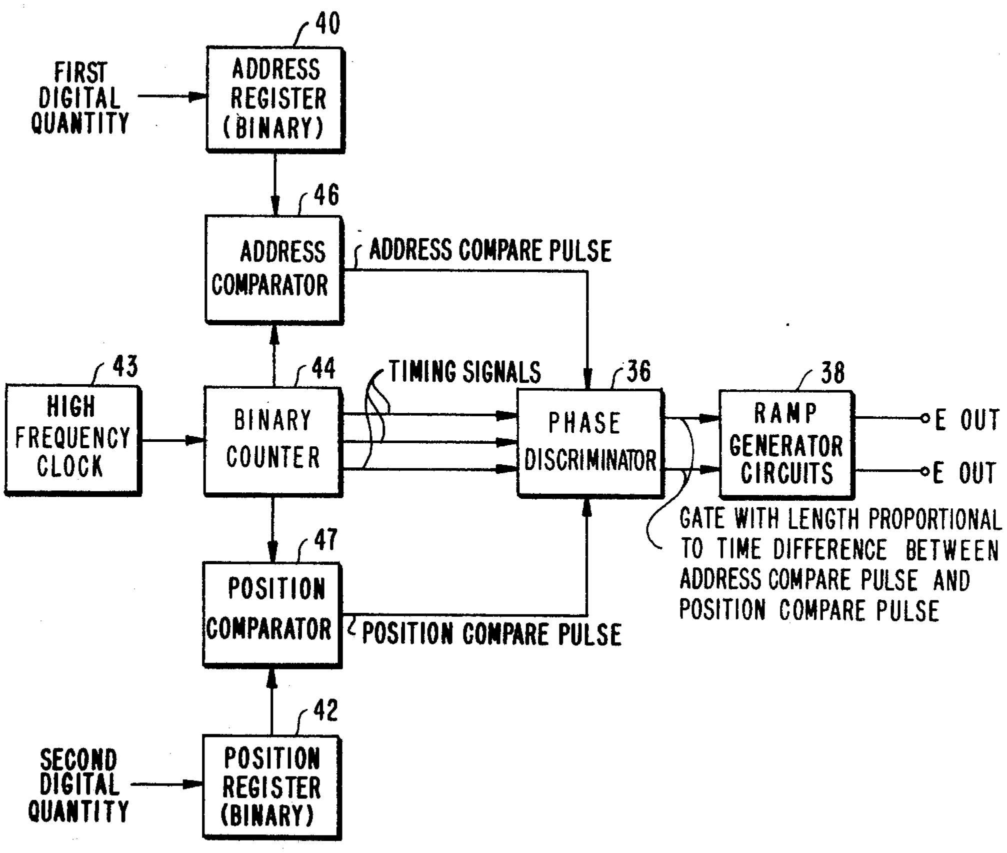
FIG. 2 is a block diagram of one form of digital comparison to analog converter circuit in accordance with the invention utilizing a phase discriminator and ramp generator circuits.

A better understanding of a specific preferred example of the digital-to-time displacement converter 34 is provided in FIG. 2. In this figure, the digital quantity representative of the desired address is identified as the "first digital quantity" and that representative of the actual position is identified as the "second digital quantity." The binary signal combinations are entered in an address register 40 and a position register 42 respectively, although registers need not be employed within the converter itself if steady state signals are provided from the associated circuits. Clock pulses from a clock 43, running at a high frequency relative to the bandwidth of the servo in order to provide a substantial multiple of a selected count, such as 512 during each servo cycle are provided as previously indicated. The clock pulses are applied directly to advance a binary counter 44, which has an appropriate number of stages such that it recycles after every 512 counts, thus providing a constantly renewed time base with 512 equal divisions. The counts from the binary counter 44 are applied to one set of inputs of an address comparator 46 and to one set of inputs of a position comparator 47. The two comparators, 46 and 47, provide individual output pulses, designated as the "address compare" and "position compare" pulses respectively, when the advancing count from the binary counter 44 is equal to the count presented to the given comparator by the associated register 40 or 42. The pulses from the two comparators 46, 47 comprise the two pulse series referred to in conjunction with FIG. 1, and are applied to the separate inputs of the phase discriminator 36. The two pulse series are at the same frequency as the recycle frequency of the binary counter 44, and the signal which denotes the completion of the count, identified as the recycle signal, is applied from the binary counter 44 to reset the phase discriminator. The phase discriminator 36 provides a gate signal having a length proportional to the time difference between each address compare pulse and the related position compare pulse, and also provides a signal to identify the lead-lag relationship. The ramp generator circuits 38 thus provide output pulses which represent the drive-in and drive-out signals previously mentioned.

Figure 3:
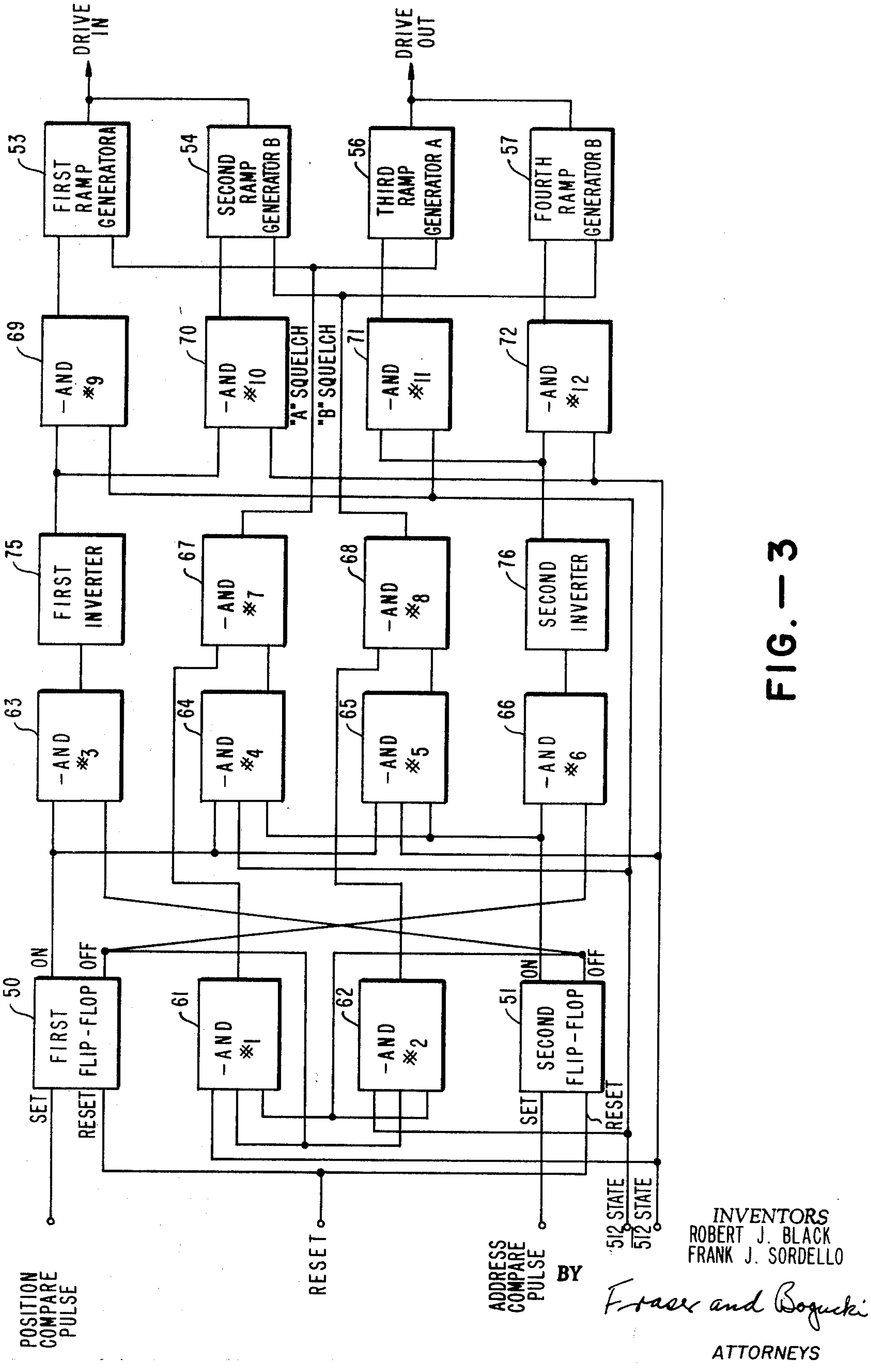
FIG. 3 is a block diagram of phase discriminator circuits which may be employed in the arrangement of FIG. 2.

A preferred arrangement of the phase discriminator and ramp generator circuits is shown in FIG. 3, and provides a means whereby discretely varying output signals which are substantially free from transient and noise components are generated for control of the operated mechanisms. The input signals to this circuit comprise the position compare pulse and address compare pulse derived from the comparators of FIG. 2, and three timing signals, identified as the 512 state, the $\overline{512}$ state and the reset signals. The various timing signals are taken from the appropriate output terminals of the correspondingly designated flip-flops in the flip-flop chain in the cycling counter of FIG. 2. The output signals from the circuit are the drive-in and drive-out signals for controlling the actuation of the radial positioning mechanism for the transducer in the random access memory system.

The phase discriminator circuit of FIG. 3 includes a pair of flip-flops 50, 51, designated as the first and second flip-flops respectively, and a plurality of AND gates together with a pair of inverters utilized for logic functions. The circuit may be regarded as divided into two halves, one concerned with drive-in and the other concerned with the drive-out signal, although the flip-flops 50, 51 are utilized for both functions. Nevertheless, first and second ramp generators 53, 54 for drive-in signal find corresponding parts in third and fourth ramp generators 56, 57 for the drive-out signal, so that a detailed explanation of only one part of the system need be given, and it will be understood that the generation of the opposite control signal is provided in a complementary fashion.

The flip-flops 50, 51 and the associated gates determine the order of precedence of the position compare pulse and the address compare pulse, and also identify the times of occurrence of these pulses in the cycle. Upon recycling of the 256 stage of the counter at the start of a count cycle, a reset pulse is passed to the flip-flops 50, 51 via a differentiating network (not shown) and the cycle of operation is begun. In each such cycle an address compare pulse and a position compare pulse will occur, although not necessarily in that order. The various AND gates are of the type which may be referred to as negative AND, or —AND, in that a rising output voltage is provided on the output terminal, to indicate a "true" condition, when the applied input signals are all indicative of the "false" state. The various —AND gates are identified as the first through twelfth (#1 through #12), and disposed in serial fashion, although they are not used in this order. Specifically, the third and sixth —AND gates are concerned with the determination of the order of precedence of the position compare pulse and address compare pulse whereas the first and second, fourth and fifth, and seventh through twelfth AND gates are concerned with alternation of the ramp generators 53, 54, 56 and 57.

Assume for purposes of explanation that operation begins in a cycle in which the $\overline{512}$ state signal is "true" and the 512 state signal is "false." If the address compare pulse precedes the position compare pulse, for example, the second flip-flop 51 is turned on, while the first flip-flop 50 remains off. In this condition, both the "on" output terminal of the first flip-flop 50 and the "off" terminal of the second flip-flop 51 are at signal levels which indicate the false condition, activating the third AND gate 63, to provide a rising output level. At this time, the 512 state signal is not applied to the ninth —AND gate 69, so that upon inversion of the output signal from the —AND gate 63 in a first inverter circuit 75, the ninth —AND gate 69 is fully actuated, thus energizing the first ramp generator circuit 53 to initiate a linearly rising signal which constitutes the output or drive-in control signal for the associated system. The first ramp generator 53 thereby generates a terminal output voltage which is dependent upon the length of time the —AND gate 69 is fully actuated, and thereafter holds this voltage level without decay over the intervals of interest. The interval of actuation is terminated by the application of the position compare pulse to the system, turning the first flip-flop 50 on, and deactivating the third —AND gate 63, to subsequently deactivate the ninth —AND gate 69.

Upon the subsequent change of state of the 512 stage of the counter, ending one count cycle and beginning another, a reset pulse is applied from the 256 stage to reset the flip-flops 50, 51. The 512 state signal goes "true" and the $\overline{512}$ state signal goes "false" so that in this alternate full cycle, the tenth —AND gate 70 is primed to be activated in response to the state of the third —AND gate 63. The second ramp generator 54 is thus operated upon the appearance of the address compare pulse as was the first ramp generator 53 in the previous cycle to maintain the drive-in signal for the subsequent full cycle, at the common drive-in output terminal.

A squelch circuit is employed for the first and third ramp generators 53, 56, and a different squelch circuit is employed for the second and fourth ramp generators 54, 57. The squelch circuits operate after the associated ramp generator of a pair is driven to its final voltage state, so that the previously activated ramp generator may then be squelched and made ready for the next operative cycle in which it is used. A typical squelch cycle proceeds as follows. Returning to the first cycle of counter operation which was described, with the 512 state "false" at the same time the third —AND gate 63 is actuated, the address compare pulse has been received subsequent to the reset pulse, and is followed by the position compare pulse. As stated previously, the first and second flip-flops 50, 51 are reset by the reset pulse, the address compare pulse precedes the position compare pulse and the system then completes the count cycle and the 512 state signal goes "true." This brings the system into the second full count cycle under these conditions, during which the second ramp generator 54 may be actuated and in which the first ramp generator 53 may be squelched. Because the error will have been substantially only slightly corrected, the same general sequence will be followed, in which the reset pulse resets the first flip-flop 50 and the second flip-flop 51, followed by the address compare pulse to turn the second flip-flop 51 "on" and the position compare pulse to turn the first flip-flop 50 "on" in that order. The "A" squelch signal is a low-level condition at the output of the seventh —AND gate 67, which condition prevails so long as either of the inputs to the seventh —AND gate 67 is at an upper voltage level. With the 512 state signal "true," the fourth —AND gate 64 output terminal is maintained at a low voltage level. However, after both flip-flops 50 and 51 are turned on, all three input levels to the first —AND gate 61 are down, so that the first —AND gate 61 is operative and its output level rises. The seventh —AND gate 67 thereupon assumes the low-level state at its output to provide the "A" squelch signal for application to the first ramp generator 53 and the third ramp generator 56. This squelch signal serves to restore the appropriate ramp generator to its original reference condition so that it is ready to develop a new analog drive signal.

The first —AND gate 61 maintains an active output applied to the seventh —AND gate 67 until the end of the count cycle, when the $\overline{512}$ state signal goes "true" and the first and second flip-flops 50, 51 are reset. At that point, however, the fourth —AND gate 64 develops a high level output for application to the seventh —AND gate 67, as a result of the low-level states at all three inputs to the fourth —AND gate 64. Thus the "A" squelch signal is continued as a low-level output from the seventh —AND gate 67 until the fourth —AND gate 64 changes condition as the result of a turning on of the second flip-flop 51 by the address compare pulse of the next count cycle. During the next count cycle, the second ramp generator 54 is activated by the tenth —AND gate 70 as described hereinabove. The second ramp generator 54 is subsequently squelched by a "B" squelch signal developed in similar fashion in the next succeeding count cycle. Thus, the first, fourth and seventh —AND gates 61, 64 and 67 control the "A" input squelch signal supplied to the first and third ramp generators 53 and 56 and the second, fifth and eighth —AND gates 62, 65 and 68 control the "B" squelch signal for the second and fourth ramp generators 54 and 57 on alternates cycles.

The system insures transient-free operation, inasmuch as the output voltage level is maintained substantially constant by the alternate ramp generator, while the previously activated ramp generator is reset to the reference level for the next generation of a ramp function. It should be particularly noted that this arrangement in accordance with the invention advantageously insures that an adequate squelch signal is applied to completely restore the particular ramp generator to its reference condition. This is accomplished without the need for providing any time interval after the end of a count cycle in which the system must wait for a ramp generator to be squelched, as might otherwise be necessary if the quelch signal is not applied until near the end of a count cycle. It will be noted that the squelch signal applied to a given ramp generator bridges two successive count cycles, so that where the compare pulses occur near the end of a count cycle the squelch signal is continued by a greater extent into the next succeeding count cycle. Control of the drive signal is shifted back and forth between the first and second ramp generators 53 and 54, on alternate cycles in which drive-in signals are being generated, smoothly and without transients by virtue of a diode arrangement, shown in FIG. 4 to be described hereinbelow, which permits the drive signal to correspond to the larger of the two analog voltages from the first and second ramp generators 53, 54.

Figure 4:
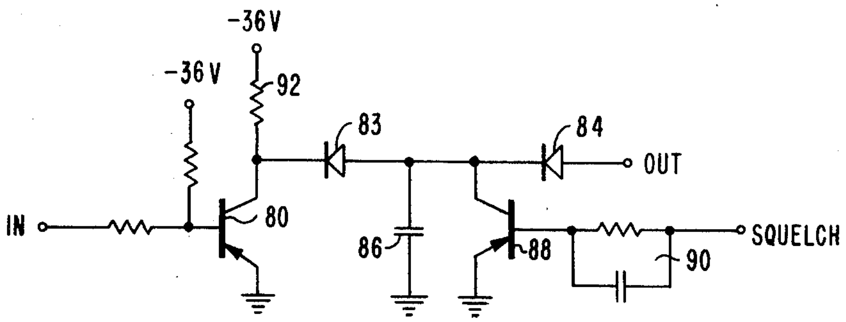
FIG. 4 is a schematic diagram of a particular ramp generator circuit which may be employed in the arrangement of FIG. 2.

A particular example of a suitable ramp generator circuit is shown in FIG. 4, and illustrates the manner in which the input signals and squelch pulses are applied. A first transistor amplifier 80 receives the input signals on its base electrode, and is coupled in a grounded emitter configuration. Output signals are derived from the collector of the first transistor amplifier 80 through a pair of serially connected diodes 83, 84 which are coupled across a storage capacitor 86. A second transistor 88 is coupled to the output circuit, and provides, when conducting, a grounding connection for the output circuit which is effective in discharging the storage capacitor 86. The second transistor 88 is turned "on" by the squelch pulses applied through a passive circuit 90. The circuit operates by charging the capacitor 86 linearly through the collector resistor 92 when an output pulse terminates conduction in the first transistor amplifier 80, and discharging the capacitor 86 through the transistor 88 when the squelch signal is applied.

Figure 5:
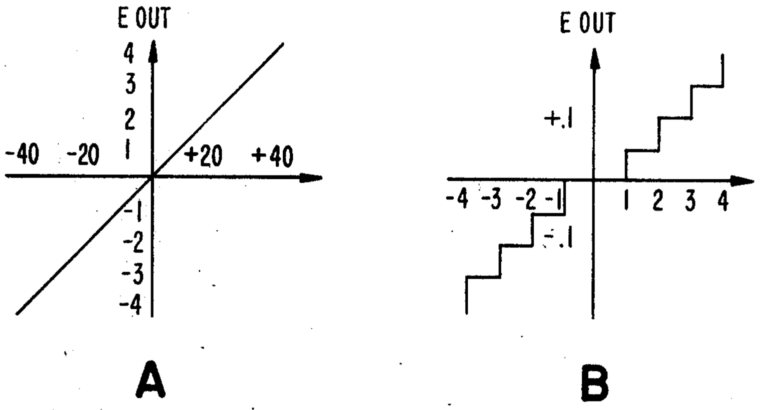
FIG. 5 is a graphical representation of waveforms, designated A and B, useful in explaining the operation of the arrangement of the system of FIGS. 2 to 4.

The graphs A and B of FIG. 5 illustrate the magnitude of the analog output voltage from the ramp generators ($E_{out}$) as a function of the difference of a digital quantity, which is applied to the system as a time difference between digital pulses of the clock counter cycle. In the graph representations in FIG. 5, the polarity of one of the drive signals has been reversed in order to show the relationship as a continuation from drive-in to drive-out through the origin. As an alternative, as in the case where the drive-in and drive-out signals are to be applied to a single drive mechanism as signals of opposite polarity, an opposite polarity signal can easily be provided by using transistors of opposite conductivity type in the third and fourth ramp generators 56 and 57, for example, and by reversing the polarities of the operating potentials and control signals applied thereto. The graph B of FIG. 5 is an enlarged scale portion of the graph A and shows discrete levels in exaggerated form corresponding to the various digital phase signals applied as inputs during a count cycle. The graphical representations of FIG. 5 illustrate the linearity which can be achieved at the output of the ramp generators, with discrete levels being established because of the highly stable alternative operation of the ramp generators. Although the signal derived from a ramp generator is developed by charging a capacitor along a ramp or sloping waveform, there is no need that the charging waveform be linear (as is the requirement in many prior art arrangements which depend upon a ramp waveform as a timing base), since it is the ultimate level at the output of the ramp gening that level which is utilized in controlling the associerator and not the waveform which is followed in reachated drive mechanism. Inasmuch as the ramp signal follows the same constant function from one cycle to the age levels of graph B of FIG. 5 are easily maintained next, and in each instance initiates from a base line which is precisely established (i.e., ground), the discrete voltwithout any requirement for stringent linearity in the charging waveform.

Substantial advantages are achieved by this system, because of the inherent accuracy and superior control which can be established. In contrast to prior art systems, which typically employ a resistor network for digital-to-analog conversion, systems in accordance with the invention achieve high accuracy through the use of a starting reference point and automatic sensing of the state of the ramp generator. The sensing may be carried out extremely rapidly, so that a great many potential levels may be discretely identified, and maintained. The waveform of the ramp generator need not be linear, and in fact a sharper slope in the immediate region of the null is preferred for superior servo response, because the greater slope permits more accurate adjustment to null conditions. When the error signal is very large, of course, the driving effect on the servo is greater, but the servo signal tends to diminish toward zero in any event as the mechanism being positioned approaches the address location, in which region the accuracy of the system remains predetermined and reliable. The clock oscillator which is employed in the system reflects upon the functioning of the servo, but need not be precise, as long as it has adequate short-term stability relative to a complete cycle time. While it is possible for some applications to develop an envelope from the ramp waveforms and to detect the amplitude to generate the error signal, this technique is not preferred because of inaccuracies produced by diode envelope detection schemes.

An important aspect of the present invention is the facility which it provides for further modification of servo characteristics.

Although the invention has been described hereinabove principally in the context of a servomechanism control system, it should be emphasized that the arrangements in accordance with the invention are not so limited but may be used to advantage any time an analog signal is desired as an indication of the difference between two binary numbers. Such a need may arise in the case of instrumentation systems, general control systems and the like.

The invention advantageously possesses the inherent capability of using low cost circuitry to provide a high DC stability output signal. This result follows from the fact that the zero analog signal does not depend upon the ramp generator circuitry, but only upon the gate which is generated by the time difference between compare pulses. Since the compare pulses are generated under the control of a recycling clock circuit, it is clear that the length of the gate, i.e. the gate time interval, is a digital quantity. This is readily convertible into an accurate analog signal in accordance with the invention by using any output signal generating circuit which develops an output signal as a function of time and which is controlled by the gate. By contrast, other circuits for the same purpose as the present invention have been subject to inaccuracies in defining the high stability analog signal due to variations of component parameters, especially semiconductor components which are usually subject to leakage and drift of potential level with time.

While the invention has been particularly shown and described with reference to a preferred embodiment thereof, it will be understood by those skilled in the art that various changes in the form and details may be made therein without departing from the spirit and scope of the invention.

What is claimed is:

1. A random access memory system for controlling the operation of a positionable transducer which is operable in response to control signals and including the combination of means for providing a binary representation of the position of the transducer, means for providing timing signals representative of the random access memory operation, means providing a binary representation of a desired address for the positionable transducer, an oscillator having a frequency which is high relative to the timing signals, a recycling counter coupled to be advanced by signals from the oscillator, first comparator means responsive to the representation of transducer position and to the recycling counter for providing a first pulse, second comparator means responsive to the representation of the desired address and to the recycling counter for providing a second pulse, and means responsive to the first and second pulses for generating a control signal of amplitude corresponding to the time displacement between the pulses and indicative of the lead-lag relationship between the two pulses, said last-mentioned means being coupled to apply the control signal to the positionable transducer.

2. A system for controlling the operation of a positionable transducer in a cyclic form of random access memory, the positionable transducer being operable in response to control signals, and including the combination of means responsive to the transducer position for providing a binary representation of the position, means synchronized with the cyclic memory for providing timing signals, means for generating the binary representation of a desired address for the positionable transducer, a clock pulse oscillator coupled to be controlled in response to the timing signals, recycling counter means coupled to be advanced by output signals from the clock pulse oscillator, the recycling counter means recycling at a count which provides a number of subcycles within a full cycle of the random access memory such that the recycling counter means is advanced at a high repetition rate relative to the cycles of the random access memory, first binary comparator means responsive to the binary representation of transducer position and to the recycling counter means for providing a first pulse during each cycle of the recycling counter means, second comparator means responsive to the binary representation of the desired address and to the recycling counter means for providing a second pulse during each cycle of the recycling counter means such that two series of pulses are generated during each cycle of the random access memory, the two series forming successive pulse pairs of first and second pulses having a time displacement corresponding to the displacement of the positionable transducer from the desired address and a lead-lag relationship representative of the sense of direction of the displacement, and means responsive to the series of pulses for generating a control signal representative of the needed correction of the positionable transducer, said control signal being applied to position the transducer, and said last-mentioned means including separate ramp generator means for each direction of movement, and binary gating means responsive to the first and second pulses and to the recycling counter means for activating said ramp generator means.

3. A system for generating a control signal for the operation of a positionable mechanism including the combination of means generating a first signal representative of a desired position for the mechanism, means responsive to the actual position of the mechanism and generating a signal representative of the actual position of the mechanism, means generating a cyclic third signal varying with time in a repetitive fashion within each cycle, a pair of comparator means, each responsive to the third signal and a different one of said first and second signals and detecting conditions of identity between the third signal and the first or second signal and generating separate time displaced pulses in response thereto, and means responsive to the time displacement between pairs of time displaced pulses for generating the control signal for the positionable mechanism, the magnitude of the control signal being a function of the time displacement of the time displaced pulses.

4. A digital-to-analog converting circuit for a system providing binary representations of first and second addresses and controlling a movable member comprising clock pulse means for generating a series of sequentially timed pulses, a recycling counter responsive to said pulses for generating sequential binary addresses, comparing means responsive to said first and second addresses for developing a first comparison signal upon the coincidence of a first position of said movable member with one of said binary addresses and a second comparison signal upon the coincidence of a second position of said movable member with another of said binary addresses, logic circuitry coupled to receive said comparison signals and to develop a gating interval related to the difference between said first and second positions, and means for generating an output signal which varies in magnitude as a function of time, said signal generating means being actuable only during said gating interval.

5. The invention as set forth in claim 4 above, including in addition means for restoring the signal generating means to a quiescent condition following said gating interval.

6. A system for controlling the position of a movable member in response to binary address and position information including the combination of means for generating a recycling binary count in repetitive fashion, a pair of comparator means, each responsive to the recycling binary count and a different one of the binary address or position information, for detecting equality between the recycling count and the address or position information, and means responsive to the respective detections of equality for generating an analog signal of amplitude proportional to the time displacement between the respective detections and polarity responsive to the lead-lag relationship of the signals.

7. A random access memory system for positioning a transducer relative to a record member, and including means for generating a high frequency signal, the system including the combination of means providing a desired digital address for the transducer, means coupled to the transducer for providing a digital signal representative of actual transducer position, means coupled to the transducer for varying the position thereof, means responsive to the high frequency signals for providing a recycling count in digital form, means responsive to the recycling count and to the desired and actual position digital addresses for generating a signal having time duration varying characteristics, and means responsive to the signal having time duration varying characteristics for generating an amplitude varying signal proportional thereto, the amplitude varying signal being coupled to control the means for varying the position of the transducer.

8. A system for generating an analog signal representative of the difference between a pair of digital quantities and including the combination of means providing a high frequency time reference signal, recycling means coupled to count the successive increments of the high frequency time reference signal; a first comparator coupled to receive a first one of the digital quantities on one input, and to receive the recycling count on the second input, a second comparator coupled to receive the other of the digital quantities on one input and to receive the recycling count on the other input, means coupled to both of the comparators for generating a time duration varying signal, and means coupled to receive the time duration varying signal for generating an output signal whose amplitude is proportional to the time duration of the varying signal.

9. The invention as set forth in claim 8 wherein the output signal generating means comprises a ramp generator for initiating a ramp signal at the start of the time duration and terminating the ramp signal at the end of the time duration, and means for holding the level of the ramp signal at the termination thereof.

10. A system for controlling a drive mechanism, the position of which is represented in digital form, in response to a command address represented in digital form, comprising a clock pulse source, a counter responsive to pulses from the clock pulse source for recycling in synchronism therewith, comparator means responsive to the digital position and digital command address for developing signals at particular points in the count cycle of the counter corresponding respectively to the digital position and digital command address, and a signal generator responsive to said comparator means for generating a drive signal which varies as a function of time between the first and second of said signals of the comparator means within a given cycle of the counter in order to develop a drive signal which corresponds to the digital separation of the position and the command address.

11. A system for controlling a drive mechanism, the position of which is represented in digital form, in response to a command address represented in digital form, comprising a clock pulse source, a counter responsive to pulses from the clock pulse source for recycling in synchronism therewith, comparator means responsive to the digital position and digital command address for developing signals at particular points in the count cycle of the counter corresponding respectively to the digital position and digital command address, a signal generator coupled to said comparator means for generating a drive signal which varies as a function of time between the first and second of said signals of the comparator means within a given cycle of the counter in order to develop a drive signal which corresponds to the digital separation of the position and the command address, and means coupled to said signal generator for maintaining said drive signal at the level attained upon the occurrence of the second comparator means signal until a succeeding drive signal is generated.

12. A system for controlling a drive mechanism, the position of which is represented in digital form, in response to a command address represented in digital form, comprising a clock pulse source, a counter responsive to pulses from the clock pulse source for recycling in synchronism therewith, comparator means responsive to the digital position and digital command address for developing signals at particular points in the count cycle of the counter corresponding respectively to the digital position and digital command address, and a signal generator coupled to said comparator means for generating drive signals which vary as a function of time between the first and second of said signals of the comparator means within a given cycle of the counter in order to develop a drive signal which corresponds to the digital separation of the position and the command address, the signal generator including plural signal generating means and means for activating the plural signal generating means alternatively during alternate cycles of the counter.

13. A system in accordance with claim 12 wherein the signal generating means further includes means for restoring a previously activated signal generating means to a reference level during the interval that another signal generating means is activated.

14. A system in accordance with claim 12 wherein the comparator comprises a pair of flip-flops respectively responsive to the command address and position address digital signals, a plurality of symmetrically arranged control channels, each including a plurality of gating circuits, coupled to receive signals from the binary counter and the flip-flops in order to develop activating signals to be applied to the signal generator respectively corresponding to alternate cycles of the binary counter.

15. A system in accordance with claim 13 wherein the comparator comprises a pair of flip-flops respectively responsive to the command address and position address digital signals, a plurality of symmetrically arranged control channels, each including a plurality of gating circuits, coupled to receive signals from the binary counter and the flip-flops in order to develop activating signals to be applied to the signal generator respectively corresponding to alternate cycles of the binary counter, one of said gating circuits being responsive to signals indicative of the state of the flip-flops and the counter for developing a squelch signal for controlling the reference level restoring means from the occurrence of a second of the digital position and digital command address signals until the end of a count cycle, and another of said gating circuits being responsive to said state signals for maintaining said squelch signal from the beginning of the succeeding count cycle until the occurrence of the first of said digital position and digital command address signals in said succeeding count cycle.

References Cited

UNITED STATES PATENTS

| | | | |
|---|---|---|---|
| 3,075,189 | 1/1963 | Lisicky | 340—347 X |
| 3,267,429 | 8/1966 | Strohmeyer | 340—347 X |
| 3,175,138 | 3/1965 | Kilroy et al. | 318—28 |
| 3,211,976 | 10/1965 | Brule et al. | 318—28 |
| 3,248,622 | 4/1966 | Kelling | 340—347 X |
| 3,319,054 | 5/1967 | Kelling | 235—154 |
| 3,370,289 | 2/1968 | Hedgcock et al. | 340—347 |
| 3,245,073 | 4/1966 | Strunk et al. | 340—347 |

MAYNARD R. WILBUR, Primary Examiner

G. R. EDWARDS, Assistant Examiner